(12) United States Patent
Chang et al.

(10) Patent No.: US 9,077,497 B2
(45) Date of Patent: Jul. 7, 2015

(54) METHOD AND APPARATUS FOR GENERATING DATA FRAME, AND METHOD AND APPARATUS FOR TRANSMITTING/RECEIVING DATA FRAME IN WIRELESS COMMUNICATION SYSTEM

(75) Inventors: Kapseok Chang, Daejeon (KR); Sung-Woo Choi, Daejeon (KR); Yong-Sun Kim, Gyeryong (KR); Wooyong Lee, Daejeon (KR); Hyun-Kyu Chung, Daejeon (KR); Hoo-Sung Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 558 days.

(21) Appl. No.: 12/862,628

(22) Filed: Aug. 24, 2010

(65) Prior Publication Data
US 2011/0051746 A1 Mar. 3, 2011

(30) Foreign Application Priority Data

Aug. 25, 2009 (KR) .................. 10-2009-0078933
Feb. 18, 2010 (KR) .................. 10-2010-0014563
Mar. 5, 2010 (KR) .................. 10-2010-0019987

(51) Int. Cl.
*H04L 29/06* (2006.01)
*H04L 1/00* (2006.01)

(52) U.S. Cl.
CPC ............ *H04L 1/0052* (2013.01); *H04L 1/0072* (2013.01); *H04L 69/22* (2013.01); *H04L 69/12* (2013.01)

(58) Field of Classification Search
CPC .................. H04L 1/0079; H04L 29/0653
USPC .................................. 370/392, 474
See application file for complete search history.

(56) References Cited

U.S. PATENT DOCUMENTS 7,548,561 B2    6/2009  Shvodian et al.

FOREIGN PATENT DOCUMENTS

KR    102090073916 A    7/2009

OTHER PUBLICATIONS

Ecma international, High Rate 60 GHz PHY, MAC, and HDMI PAL, ECMA-387, 1st edition, Dec. 2008.*
Kapseok Chang et al., "Change Request for ECMA-387 PHY Header", Ecma/TC48/2010/016, Apr. 2010, Ecma International.
Kapseok Chang et al., "Removing Symbol Interleaver Block in Type B", Ecma/TC48/2010/017, May 2010, Ecma International.

* cited by examiner

*Primary Examiner* — Benjamin Lamont

(57) ABSTRACT

A method for generating a data frame in a wireless communication system includes generating a plurality of first headers having information about the number of segments of a payload, generating a plurality of second headers having information about a transmission mode and a length of predetermined segments among segments of the payload, generating a third header having a transmission mode and a length of remaining segments of the payload; generating a fourth header having supplementary information of the payload and error information of the supplementary information and the first to third headers or error information of the supplementary information and the third header; and generating a data frame with the first to fourth headers sequentially allocated.

18 Claims, 13 Drawing Sheets

METHOD AND APPARATUS FOR GENERATING DATA FRAME, AND METHOD AND APPARATUS FOR TRANSMITTING/RECEIVING DATA FRAME IN WIRELESS COMMUNICATION SYSTEM

CROSS-REFERENCE(S) TO RELATED APPLICATIONS

The present application claims priority of Korean Patent Application Nos. 10-2009-0078933, 10-2010-0014563 and 10-2010-0019987, filed on Aug. 25, 2009, Feb. 18, 2010 and Mar. 5, 2010, respectively, which are incorporated herein by reference in their entirety.

BACKGROUND OF THE INVENTION

1. Field of the Invention

Exemplary embodiments of the present invention relate to a method and apparatus for generating a data frame and a method and apparatus for transmitting/receiving a data frame in a wireless communication system; and more particularly, to a method and apparatus for generating a data frame, and a method and apparatus for transmitting/receiving a data frame to reduce the complexity of a device for receiving a data frame and a manufacturing cost thereof.

2. Description of Related Art

A typical data frame of a European Computer Manufacturers Association (ECMA) standard includes a Fixed Length Physical (FL PHY) header, a Variable Length Physical (VL PHY) Header, an Antenna Training Indicator Field (ATIF), a Medium Access Control (MAC) header, and a Payload. A device that receives the ECMA data frame decodes the FL PHY header at first. Then, the device sequentially receives the VL PHY header, the ATIF, and the MAC header and decodes the received data. Accordingly, the device has to buffer the Payload during decoding entire header information.

The device takes a comparatively long time to decode the header information. That is, long latency is generated to decode the header information. As a result, complexity of the device increases to reduce the latency of decoding the header information. Since such long latency increases a buffering amount of a payload, the device is disadvantageously required to have a large buffer. Further, a response frame may not be fed back within a Short Inter Frame Space (SIFS) after receiving the data frame due to the increment of the latency for decoding the header information.

SUMMARY OF THE INVENTION

An embodiment of the present invention is directed to a method and apparatus for generating a data frame, and a method and apparatus for transmitting and receiving a data frame in order to reduce complexity of a receiving device and a manufacturing cost thereof.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a method for generating a data frame in a wireless communication system includes: generating a plurality of first headers having information about the number of segments of a payload; generating a plurality of second headers having information about a transmission mode and a length of predetermined segments among segments of the payload; generating a third header having a transmission mode and a length of remaining segments of the payload; generating a fourth header having supplementary information of the payload and error information of the supplementary information and the first to third headers or error information of the supplementary information and the third header; and generating a data frame with the first to fourth headers sequentially allocated.

In accordance with another embodiment of the present invention, a method for transmitting a data frame in a wireless communication system includes: generating a data frame; and transmitting the generated data frame to a receiving device. The data frame includes a plurality of first header having information about the number of segments of a payload; a plurality of second header having information about a transmission mode and a length of predetermined segments among the segments of the payload; a third header having information about a transmission mode and a length of remaining segments of the payload; a forth header having information about supplementary information of the payload and error information of the supplementary information and the first to third headers or error information of the supplementary information and the third header, wherein the first to fourth headers are sequentially allocated in the data frame.

In accordance with another embodiment of the present invention, a method for receiving a data frame in a wireless communication system includes: receiving a data frame from a transmitting device; and decoding the received data frame, wherein the data frame includes a plurality of first header having information about the number of segments of a payload; a plurality of second header having information about a transmission mode and a length of predetermined segments among the segments of the payload; a third header having information about a transmission mode and a length of remaining segments of the payload; a forth header having information about supplementary information of the payload and error information of the supplementary information and the first to third headers or error information of the supplementary information and the third header, wherein the first to fourth headers are sequentially allocated in the data frame.

In accordance with an embodiment of the present invention, an apparatus for generating a data frame in a wireless communication system includes: a first header generator configured to generate a plurality of first headers having information about the number of segments of a payload; a second header generator configured to generate a plurality of second headers having information about a transmission mode and a length of predetermined segments among the segments of the payload; a third header generator configured to generate a third header having information about a transmission mode and a length of remaining segments of the payload; a fourth header generator configured to generate a fourth header having supplementary information of the payload, and error information of the supplementary information and the first to third headers, or error information of the supplementary information and the third header; and a frame generator configured to generate a data frame with the first to fourth headers sequentially allocated.

In accordance with an embodiment of the present invention, an apparatus for transmitting a data frame in a wireless communication system includes: a frame generator configured to generate a data frame; and a frame transmitter configured to transmit the generated data frame to a receiving device, wherein the data frame includes: a plurality of first header having information about the number of segments of a payload; a plurality of second header having information about a transmission mode and a length of predetermined segments among the segments of the payload; a third header having information about a transmission mode and a length of remaining segments of the payload; a forth header having information about supplementary information of the payload and error information of the supplementary information and the first to third headers or error information of the supplementary information and the third header, wherein the first to fourth headers are sequentially allocated in the data frame.

In accordance with an embodiment of the present invention, an apparatus for receiving a data frame in a wireless communication system includes: a frame receiver configured to receive a data frame from a transmitting device; and a decoder configured to decode the data frame, wherein the data frame includes: a plurality of first header having information about the number of segments of a payload; a plurality of second header having information about a transmission mode and a length of predetermined segments among the segments of the payload; a third header having information about a transmission mode and a length of remaining segments of the payload; a forth header having information about supplementary information of the payload and error information of the supplementary information and the first to third headers or error information of the supplementary information and the third header, wherein the first to fourth headers are sequentially allocated in the data frame.

DESCRIPTION OF SPECIFIC EMBODIMENTS

Figure 1:
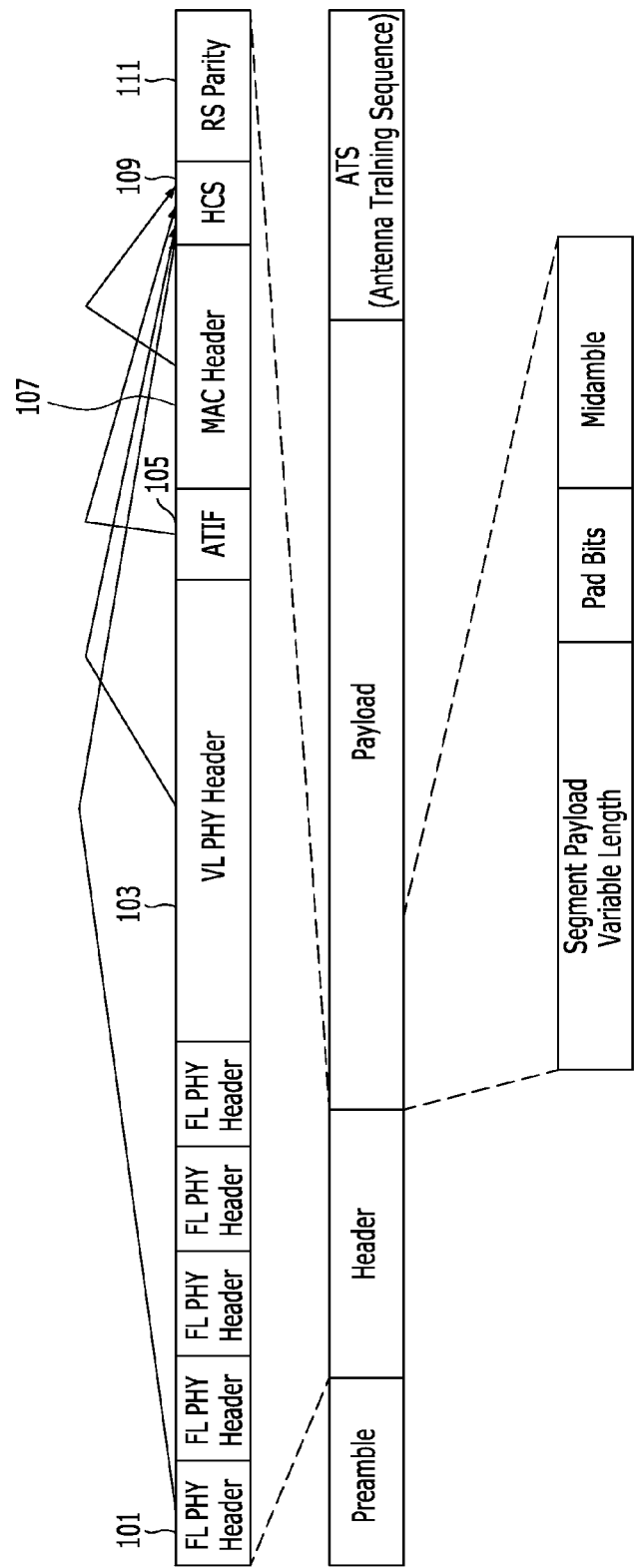
FIG. 1 is a diagram illustrating a format of a data frame of a wireless communication system employing an ECMA-387 standard.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments.

FIG. 1 is a diagram illustrating a typical format of a data frame of a wireless communication system employing an ECMA-387 standard.

As shown in FIG. 1, the EMCA data frame includes a preamble, a header, a payload, and an Antenna Training Sequence (ATS). The payload includes a plurality of segments each having a variable length, a Pad Bits, and a Midamble. The header includes a FL PHY header 101, a VL PHY header, an ATIF 105, a MAC header 107, a Header Check Sequence (HCS) 109, and a Reed-Solomon (RS) parity 111.

The FL PHY header 101 includes information about the number of segments included in the payload. The VL PHY header 103 includes information about a transmission mode and a length of each segment in the payload. The ATIF 105 includes beam forming information of the data frame. The MAC header 107 includes MAC information. The HCS 109 is an error detection code. The HCS 109 includes error detection code information for the FL PHY header 101, the VL PHY header 103, the ATIF 105, and the MAC header 107. The RS parity 111 is an error correction code. The RS parity 111 includes information to correct errors in the VL PHY header 103, the ATIF 105, and the MAC header 107.

A receiving device denotes a device that receives the ECMA data frame. The receiving device checks information about the payload by decoding the headers. Five FL PHY headers 101 are allocated to the data frame. The receiving device decodes the FL PHY headers 101 according to a repetition coding scheme. The receiving device may demodulate and decode the FL PHY headers 101 using a five-time combining scheme or a Majority decoding scheme.

The receiving device decodes the VL PHY header 103, the ATIF 105 and the MAC header 107 using a Reed-Solomon (RS) coding scheme. The receiving device sequentially demodulates the VL PHY header 103 to the RS parity 111 and generates a binary data stream. Then, the receiving device corrects errors of the VL PHY header 103, the ATIF 105, and the MAC header 107 using the RS parity 111. The receiving device detects errors of the VL PHY header 103, the ATIF 105, and the MAC header 107 using the HCS 109. When error is not detected, the receiving device may check information included in the FL PHY header 101, the VL PHY header 103, the ATIF 105, and the MAC header 107. Here, since the FL PHY header 101 includes information about the number of segments in the payload, the receiving device must correctly decode the FL PHY header 101 to check the information of the VL PHY header 103.

As described above, the receiving device must decode the FL PHY header 101 to the MAC header 107 and correct the error thereof before decoding the payload. Therefore, the receiving device has to buffer the payload until decoding the entire header information of the data frame although he receiving device receives the payload which follows after the headers. Since a large amount of memory is required to analyze the headers of the data frame and the latency caused by decoding the entire header information is comparatively long, the buffering amount of the payload also increases.

Accordingly, the complexity of the receiving device and the manufacturing cost thereof have become increased in order to improve the efficiency or to increase a decoding speed of the data frame. Further, a response frame may be not fed back within a Short Inter Frame Space (SIFS) after receiving the data frame because the latency for decoding entire header information of the data frame is very long.

Hereinafter, a data frame format in accordance with an embodiment of the present invention will be described. That is, the present invention relates to a data frame format for effective receiving and decoding a data frame without increasing the complexity of a receiving device and a manufacturing cost thereof. The present invention provides the above discussed effects by modifying the configuration of headers allocated in a data frame using header information described in FIG. 1. The data frame in accordance with an embodiment of the present invention permits a receiving device to effective decode a payload allocated after headers by permitting the receiving device to separately decode each header or to decode all headers at the same time.

Hereinafter, a method and apparatus for generating, transmitting, and receiving a data frame in accordance with an embodiment of the present invention will be described. In the specification, a device denotes an apparatus for generating and receiving a data frame in a wireless communication system. The device may be an access point or a terminal.

Figure 2:
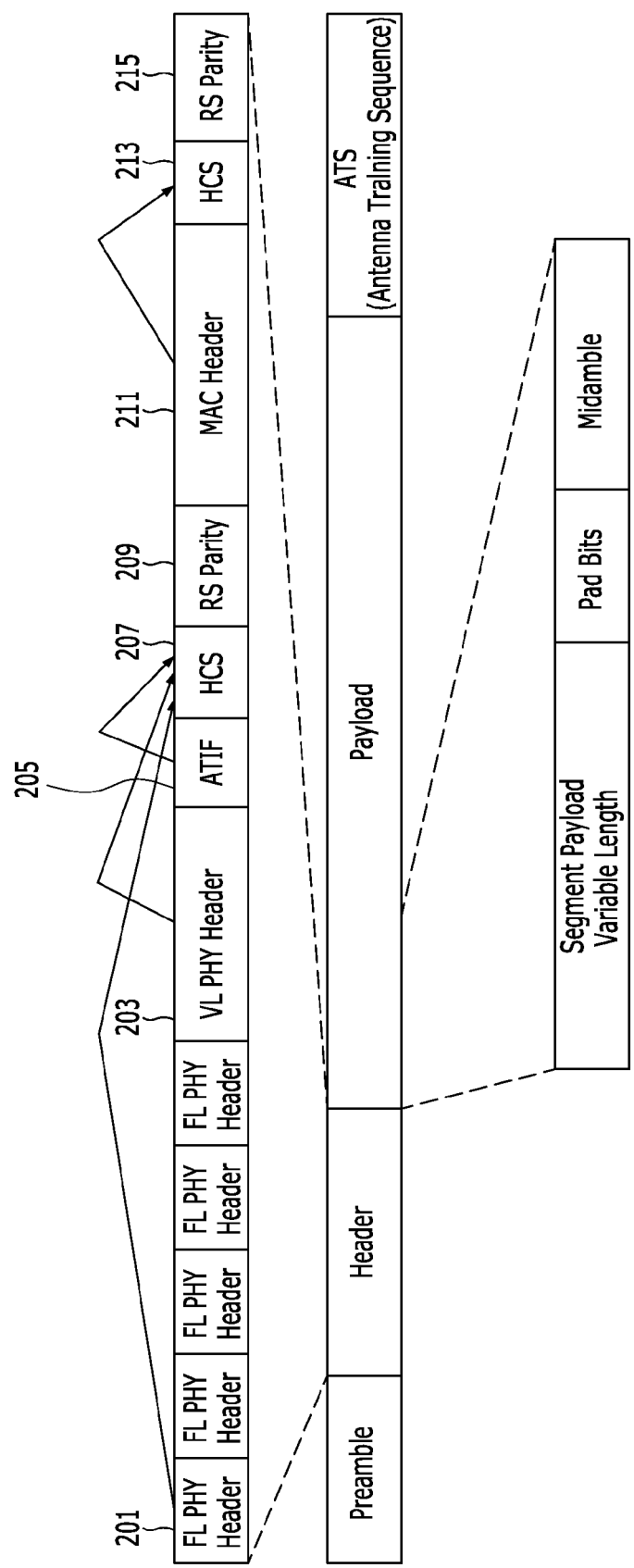
FIG. 2 is a diagram illustrating a data frame format in accordance with a first embodiment of the present invention.

FIG. 2 is a diagram illustrating a data frame format in accordance with a first embodiment of the present invention.

Referring to FIG. 2, the data frame in accordance with the first embodiment of the present invention includes a FL PHY header 201, a VL PHY header 203, an ATIF 205, HCSs 207 and 219, RS parities 209 and 215, and a MAC header 211. Five FL PHY headers 201 are allocated in the data frame in accordance with the first embodiment of the present invention. After the FL PHY header 201, the VL PHY header 203 and the ATIF 205 are sequentially allocated in the data frame. Then, the HCS 207 is allocated. The HCS 207 includes an error detection code for the FL PHY header 201, the VL PHY header 203, and the ATIF 205. Then, the RS parity 209 including an error correction code for the VL PHY header 203 and the ATIF 205 is allocated in the data frame. Then, the HCS 213 and the RS parity 215 are allocated in the data frame. The HCS 213 and the RS parity 215 include an error detection code and an error correction code for the MAC header 211.

A receiving device for receiving the data frame of FIG. 2 performs decoding and error correction using a repetition coding scheme for the FL PHY headers 201. Then, the receiving device decodes the remaining header information using a RS coding scheme. That is, the receiving device receives a base band signal of the VL PHY header 203 and the ATIF 205 and corrects error of the VL PHY header 203 and the ATIF 205 using the RS parity 209.

When error is detected, the receiving device stops demodulating and decoding the data frame. When error is not detected, the receiving device continuously demodulates and decodes the data frame. That is, the receiving device can be aware of information about a transmission mode and a length of each segment of the payload, which is included in the VL PHY header 203, by decoding headers allocated after the FL PHY header 201. Accordingly, the receiving device can decode the payload.

The data frame in accordance with the first embodiment of the present invention includes the HSC 207 and the RS parity 209 for the VL PHY header 203. The HSC 207 and the RS parity 209 are allocated prior to the MAC header 211. Accordingly, the receiving device can check information about the transmission mode and the length of each segment in the payload by decoding the VL PHY header 203 before decoding the MAC header 211. Therefore, the receiving device can decode the payload before decoding the data frame until the MAC header 211. Accordingly, the latency caused by decoding entire headers of the data frame can be reduced. Further, excessive buffering of the payload can be reduced. Moreover, it is possible to reduce transmission failure of a response frame within a Short Inter Frame Space (SIFS) after receiving the data frame.

As described above, the data frame in accordance with the first embodiment of the present invention can permit the receiving device to perform decoding the payload while performing decoding and error correction for the MAC header 211.

Figure 3:
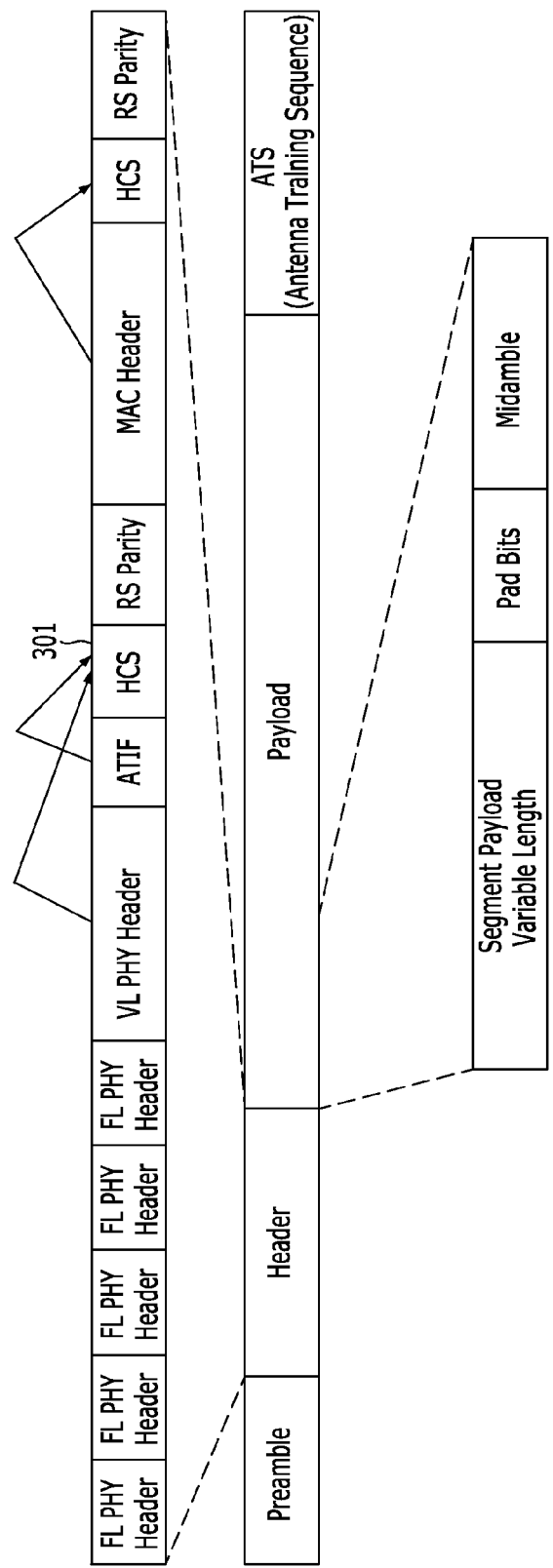
FIG. 3 is a diagram illustrating a data frame format in accordance with a second embodiment of the present invention.

FIG. 3 is a diagram illustrating a data frame format in accordance with a second embodiment of the present invention.

The data frame format of FIG. 3 is similar to that of FIG. 2. Unlike the data format of FIG. 2, a HCS 201 of FIG. 3 does not include an error correction code for a FL PHY header.

In general, a FL PHY header has a channel coding gain higher than those of the VL PHY header and the ATIF. That is, if the FL PHY header includes error, the VL PHY header or the ATIF must have error. Therefore, the HCS 301 of FIG. 3 does not include an error detection code for the FL PHY header.

Figure 4:
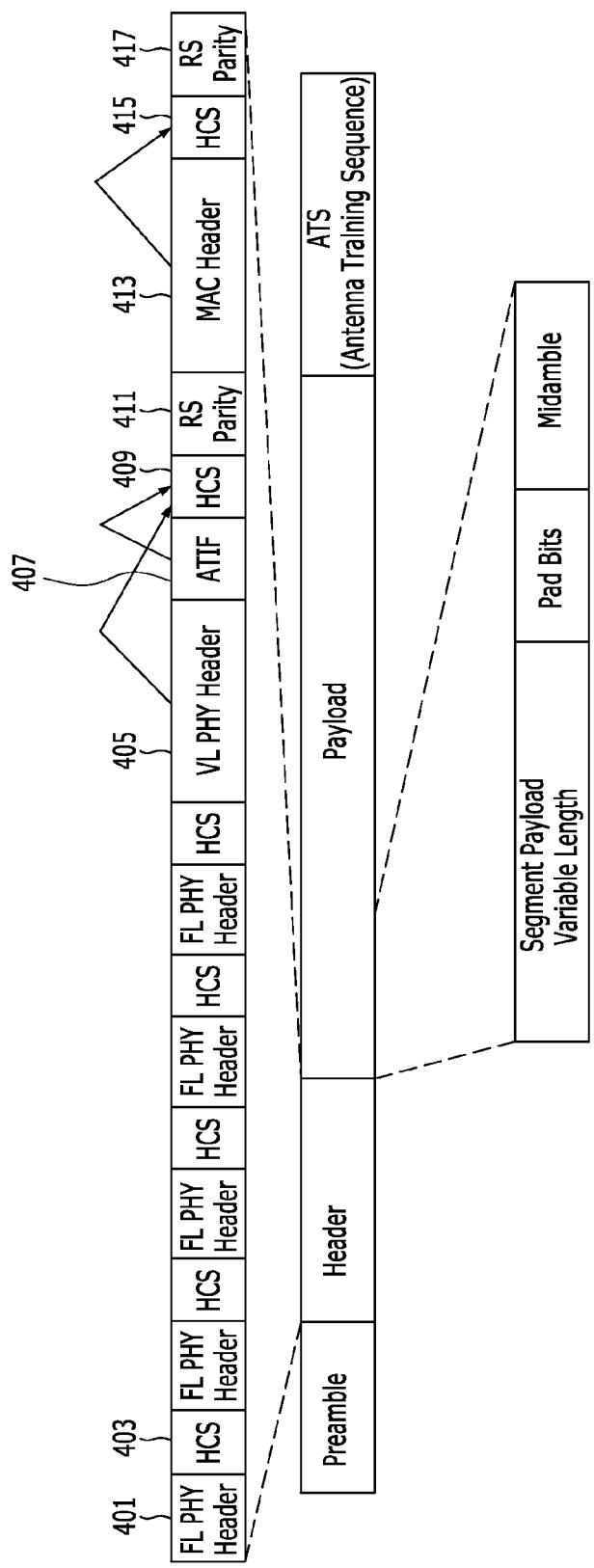
FIG. 4 is a diagram illustrating a data frame format in accordance with a third embodiment of the present invention.

FIG. 4 is a diagram illustrating a data frame format in accordance with a third embodiment of the present invention.

Referring to FIG. 4, the data frame in accordance with the third embodiment of the present invention includes a plurality of FL PHY headers 401, a HCS 403 for the plurality of FL PHY headers 401, a VL PHY header 405, an ATIF 407, HCSs 409 and 415, RS parities 411 and 417, and a MAC header 413. In the data frame in accordance with the third embodiment of the present invention, five FL PHY headers 401 are allocated. After the five FL PHY headers 401, five HCSs 403 each having an error detection code for each corresponding FL PHY header 401. After the HCSs 403, a VL PHY header 405, and an ATIF 407 are allocated. Then, a HCS 409 and a RS parity 411 for the VL PHY header 405 and the ATIF 407 are allocated. Then, a MAC header 413 is allocated, and a HCS 415 and a RS parity 417 for the MAC header 413 are allocated in the data frame in accordance with the third embodiment of the present invention.

A receiving device for receiving the data frame of FIG. 4 performs decoding and error correction according to a repetition coding scheme based on the five FL PHY headers 401. Then, the receiving device detects error in the five FL PHY headers 401 using the five HCSs 403.

The receiving device receives a baseband signal of the VL PHY header 405 and the ATIF 407 and corrects error of the VL PHY header 405 and the ATIF 407 using the RS parity 411. Then, the receiving device detects errors of the VL PHY header 405 and the ATIF 407 using the HCS 409.

When error is detected, the receiving device stops demodulating and decoding the data frame. When error is not detected, the receiving device continuously performs demodulating and decoding. That is, like FIG. 2, the receiving device can be aware of information about a transmission mode and a length of each segment of the payload, which is included in the VL PHY header 405, by decoding headers allocated after the FL PHY header 401. Accordingly, the receiving device can decode the payload.

In the data frame in accordance with the third embodiment of the present invention, the HCS 409 and the RS parity 411 for the VL PHY header 405 are allocated prior to the MAC header 413. Therefore, the receiving device decodes the VL PHY header 405 before decoding the MAC header 413 to check a transmission mode and a length of each segment in the payload. Since the receiving device can decode the payload before decoding the data frame until the MAC header 413, the latency caused by decoding the entire header can be reduced and the excessive buffering of the payload can be reduced. Further, the receiving device can decode the payload while decoding the MAC header 413 and correcting errors in the MAC header 413.

Figure 5:
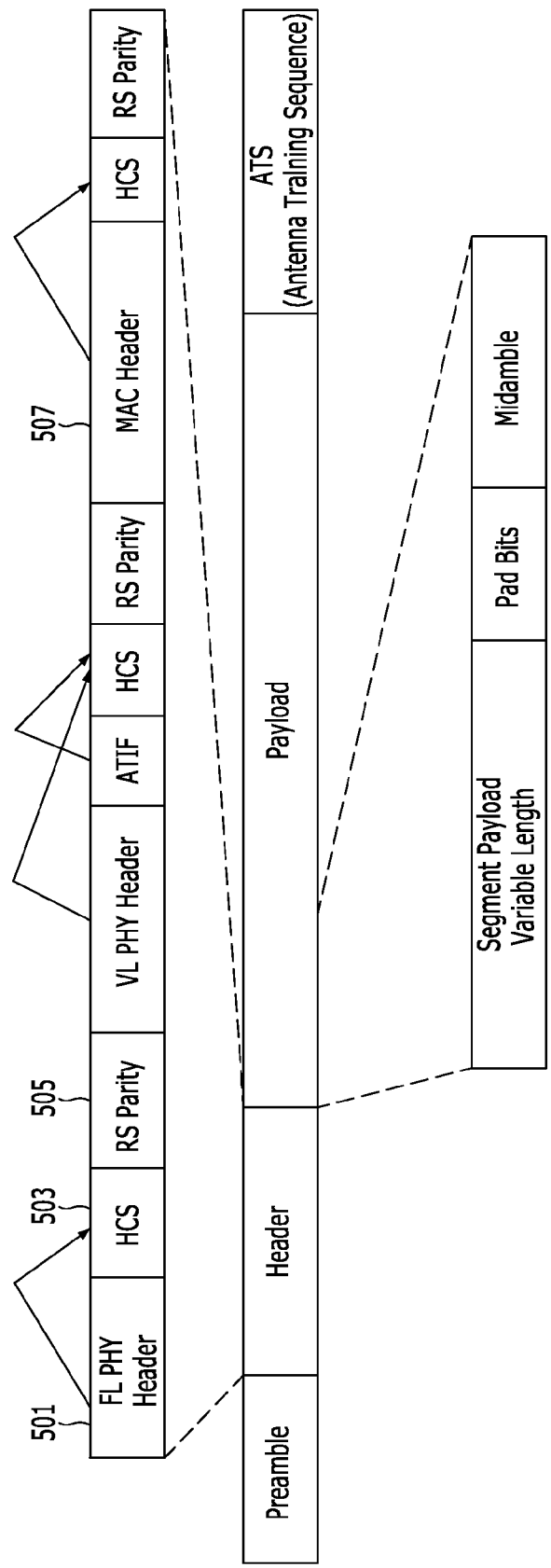
FIG. 5 is a diagram illustrating a data frame format in accordance with a fourth embodiment of the present invention.

FIG. 5 is a diagram illustrating a data frame format in accordance with a fourth embodiment of the present invention.

Unlike the data frame format shown in FIG. 2, the data frame format of FIG. 5 includes one FL PHY header 501. Since it is not required to employ a repetition coding scheme for the FL PHY header 501, a RS parity 505 for the FL PHY header 501 is allocated in the data frame of FIG. 5 in order to perform RS decoding for the FL PHY header 501.

As described above, a receiving device performs demodulation and decoding of a data frame according to whether error is detected in the FL PHY header 501 or not and can decode a payload before decoding a data frame until the MAC header 507.

Meanwhile, a receiving device may use other schemes to decode the FL PHY header 501 rather than a RS coding scheme. According to a coding scheme, an order of decoding the HCS 503 and the RS parity 505 may be changed.

Figure 6:
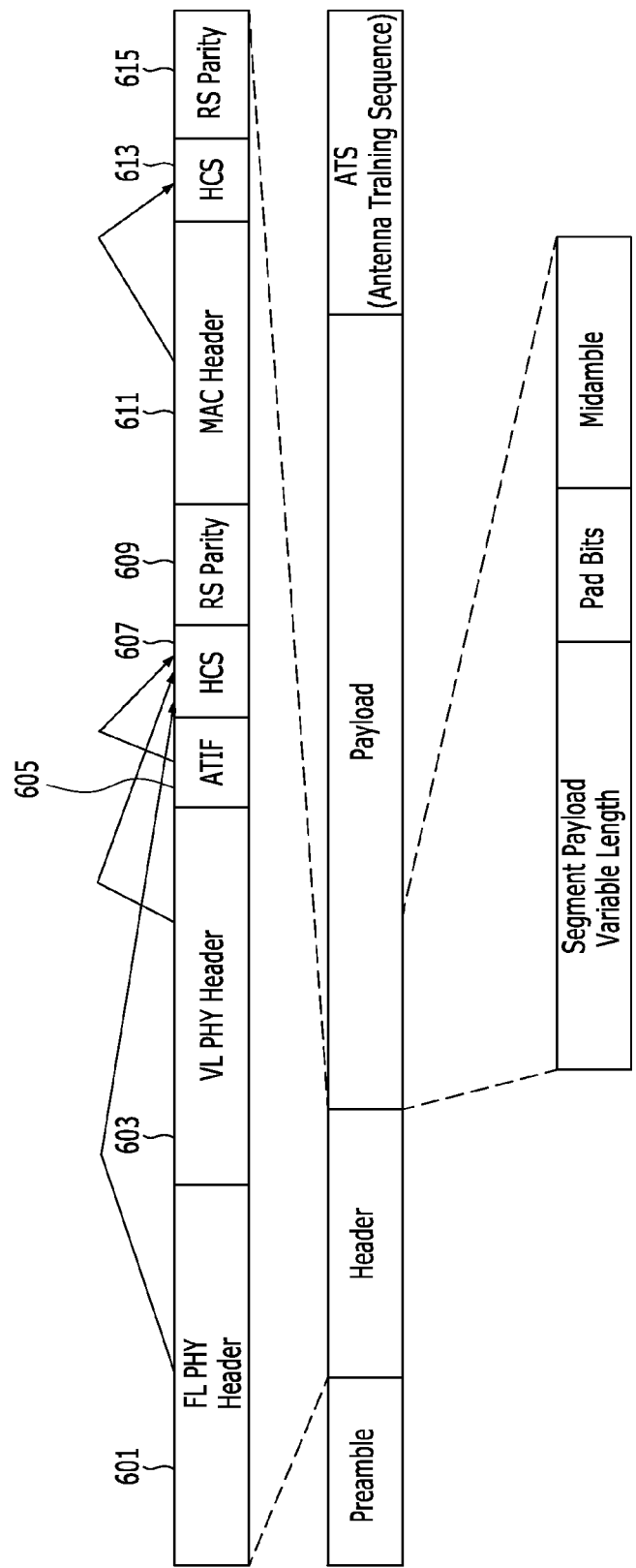
FIG. 6 is a diagram illustrating a data frame format in accordance with a fifth embodiment of the present invention.

FIG. 6 is a diagram illustrating a data frame format in accordance with a fifth embodiment of the present invention.

Unlike the data frame format of FIG. 5, the data frame format of FIG. 6 does not include a HCS and a RS parity for a FL PHY header 601. The data frame of FIG. 6 includes a HCS 607 and a RS parity 609 for a FL PHY header 601, a VL PHY header 603, and an ATIF 605. Accordingly, a receiving device performs decoding the FL PHY header 601, the VL PHY header 603, and the ATIF 605 at the same time unlike the data frames of FIGS. 2 to 5. That is, in case of the data frames of FIGS. 2 to 5, decoding for a FL PHY header is performed at first. Then, decoding for a VL PHY header and an ATIF is performed. In case of a data frame of FIG. 6, decoding for the FL PHY header 601, the VL PHY header 603, and the ATIF 605 is performed at the same time.

Referring to the data frame of FIG. 6, a receiving device sequentially receives a FL PHY header 601, a VL PHY header 603, an ATIF 605, a HCS 607, and a RS parity 609 and generates a binary data stream. The receiving device corrects errors using the RS parity 609 and detects an error using the HCS 607. According to the result of error detection, the receiving device may stop or continuously perform demodulation or decoding the payload. The receiving device decodes the MAC header 611 using the HCS 613 and the RS parity 615 for the MAC header 611.

As described above, the receiving device can decode the payload before the data frame is decoded until the MAC header 611. Accordingly, the latency of decoding entire header can be reduced. Further, the excessive buffering of payload can be reduced.

Figure 7:
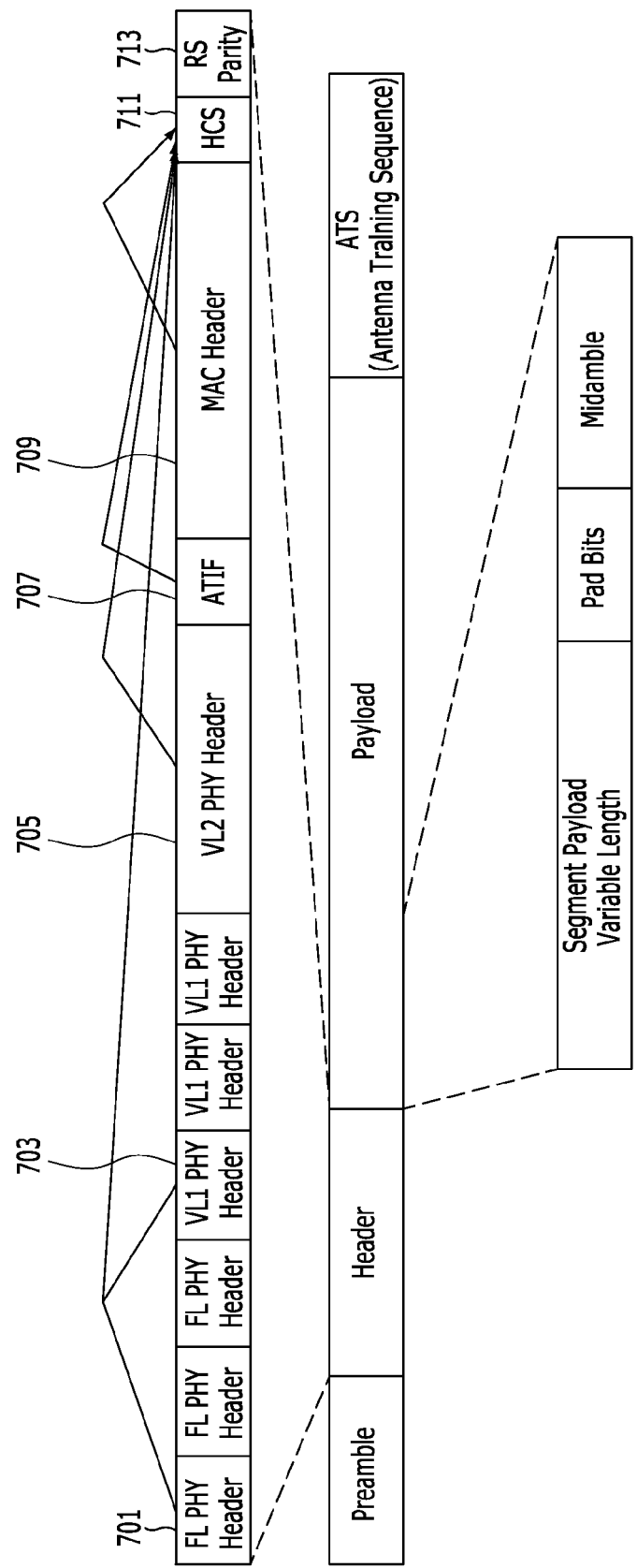
FIG. 7 is a diagram illustrating a data frame format in accordance with a sixth embodiment of the present invention.

FIG. 7 is a diagram illustrating a data frame format in accordance with a sixth embodiment of the present invention.

Referring to FIG. 7, in the data frame in accordance with the sixth embodiment of the present invention, three FL PHY headers 701, three VL1 PHY headers 703, a VL2 PHY header 705, an ATIF 707, and a MAC header 709 are allocated sequentially. Then, a HCS 711 is allocated. The HCS 711 includes an error detection code for the FL PHY header 701, the VL1 PHY header 703, the VL2 PHY header 705, the ATIF 707, and the MAC header 709. After the HCS 711, a RS parity 713 is allocated. The RS parity 713 includes an error correction code for the VL2 PHY header 705, the ATIF 707, and the MAC header 709.

Here, information about segments of the payload included in one VL PHY header is divided and included in the VL1 PHY header 703 and the VL2 PHY header 705. That is, the VL1 PHY header 703 includes information about a transmission mode and a length of predetermined segments among segments included in the payload, and the VL2 PHY header 705 includes information about a transmission mode and a length of the remaining segments thereof. For example, the VL1 PHY header 703 includes information about the first segment and the VL2 PHY header 703 includes information about the remaining segments of the payload.

A receiving device uses the repetition coding scheme to decode and correct errors in the three FL PHY headers 701 and the three VL1 PHY header 703. The receiving device generates a binary data stream by sequentially receiving the VL2 PHY header 705, the ATIF 707, the MAC header 709, the HCS 711, and the RS parity 713. The receiving device uses the RS parity 713 to decode and correct errors in the VL2 PHY header 705, the ATIF 707, and the MAC header 709. The receiving device detects errors of the FL PHY header 701, the VL1 PHY header 703, the VL2 PHY header 705, the ATIF 707, and the MAC header 709. Meanwhile, the HCS 711 may not include an error detection code for the FL PHY header 701 and the VL1 PHY header 703.

The receiving device stops demodulating and decoding the data frame when error is detected. When the error is not detected, the receiving device continuously performs demodulating and decoding the data frame. That is, the receiving device can be aware of information about a transmission mode and a length of predetermined segments, which is included in the VL1 PHY header 703, and can decode the predetermined segments included the payload.

Therefore, the receiving device can decode the predetermined segments of the payload before decoding header information allocated after the VL1 PHY header 703. When the predetermined segment is the first segment, the VL2 PHY header 705 is decoded while the first segment is decoded. Therefore, the remaining segments are continuously decoded. That is, a part of the payload is decoded before decoding information about headers allocated after the VL1 PHY header 703. Therefore, the latency caused by decoding the entire header can be reduced. Further, the excessive buffering for the payload can be also reduced.

Figure 8:
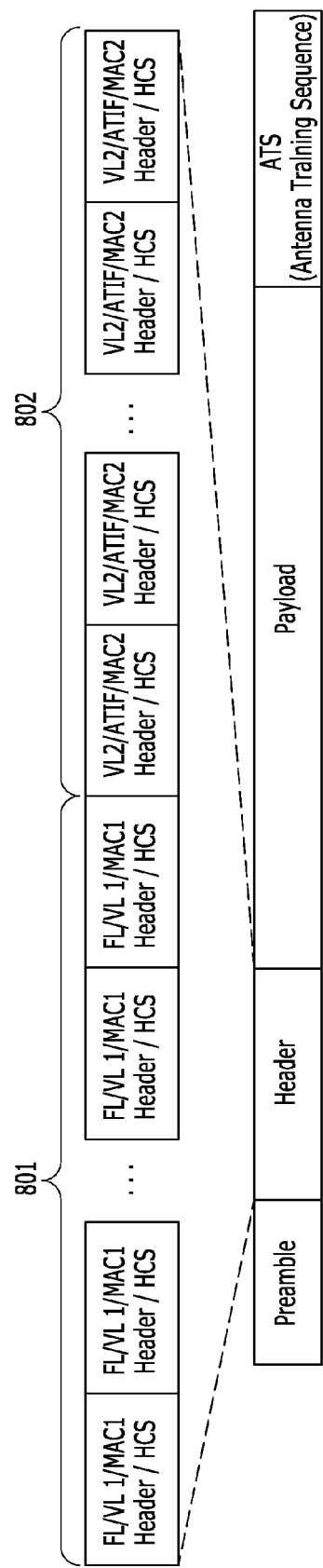
FIG. 8 is a diagram illustrating a data frame format in accordance with a seventh embodiment of the present invention.

FIG. 8 is a diagram illustrating a data frame format in accordance with a seventh embodiment of the present invention.

As shown in FIG. 8, a data frame in accordance with the seventh embodiment of the present invention includes a MAC1 header and a MAC2 header. MAC information of segments of a payload is divided and allocated to the MAC1 header and the MAC2 header. Like the VL1 PHY header 703 and the VL2 PHY header 705 of FIG. 7, the MAC1 header includes MAC information of predetermined segments among segments included in the payload and the MAC2 header includes MAC information of the remaining segments thereof. Unlike the MAC2 header, the MAC1 header further includes basic MAC information.

In a first region 801 of the data frame in accordance with the seventh embodiment of the present invention, a FL PHY header, a VL1 PHY header, a MAC1 header, and a HCS for the FL PHY header, the VL1 PHY header, and the MAC1 header are repeatedly allocated. In the second region 802 of the data frame in accordance with the seventh embodiment of the present invention, a VL2 PHY header, an ATIF, a MAC2 header, and a HCS for the VL2 PHY header, the ATIF, and the MAC2 header are repeatedly allocated. The ATIF may be repeatedly allocated in the first region 801. The HCS is allocated only to one of the first region 801 and the second region 802 to be used to detect errors in the VL1 PHY header, the MAC1 header, the VL2 PHY header, the ATIF, and the MAC2 header.

Regarding to the data frame in accordance with the seventh embodiment of the present invention, a receiving device decodes the data frame and corrects errors thereof according to a repetition coding scheme. Accordingly, the latency caused by decoding the entire header can be reduced and the excessive buffering of the payload can be reduced.

Meanwhile, the FL PHY header, the VL1 PHY header, the VL2 PHY header, the MAC1 header, the MAC2 header, and the HCS for the headers may be repeatedly allocated in the data frame in accordance with the seventh embodiment of the present invention like those shown in FIG. 7.

Figure 9:
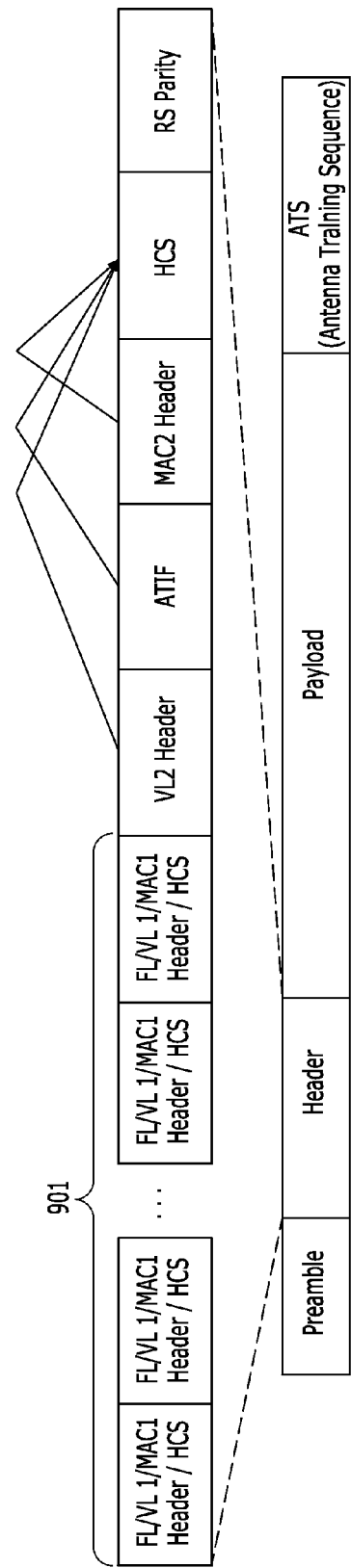
FIG. 9 is a diagram illustrating a data frame format in accordance with an eighth embodiment of the present invention.

FIG. 9 is a diagram illustrating a data frame format in accordance with an eighth embodiment of the present invention.

As shown in FIG. 9, a FL PHY header, a VL1 PHY header, a MAC1 header, and a HCS for the headers are repeatedly allocated in a predetermined region 901 in the data frame in accordance with the eighth embodiment of the present invention like the FL PHY header and the VL1 headers shown in FIG. 7. Then, a VL2 PHY header, a MAC2 header, an ATIF, and a HCS and a RS parity for the VL2 PHY header, the MAC2 header and the ATIF are sequentially allocated in the data frame in accordance with the eighth embodiment of the present invention. The ATIF may be repeatedly allocated with the FL PHY header, the VL1 PHY header, and the MAC1 header.

Regarding the data frame in accordance with the eighth embodiment of the present invention, a receiving device decodes header information of the predetermined region 901 and corrects errors thereof according to a repetition coding scheme. Then, the receiving device decodes the remaining header information according to a RS coding scheme. Therefore, a part of the payload can be decoded before decoding entire header information. Therefore, the latency caused by decoding the entire header information can be reduced, and the excessive buffering of the payload can be reduced.

Figure 10:
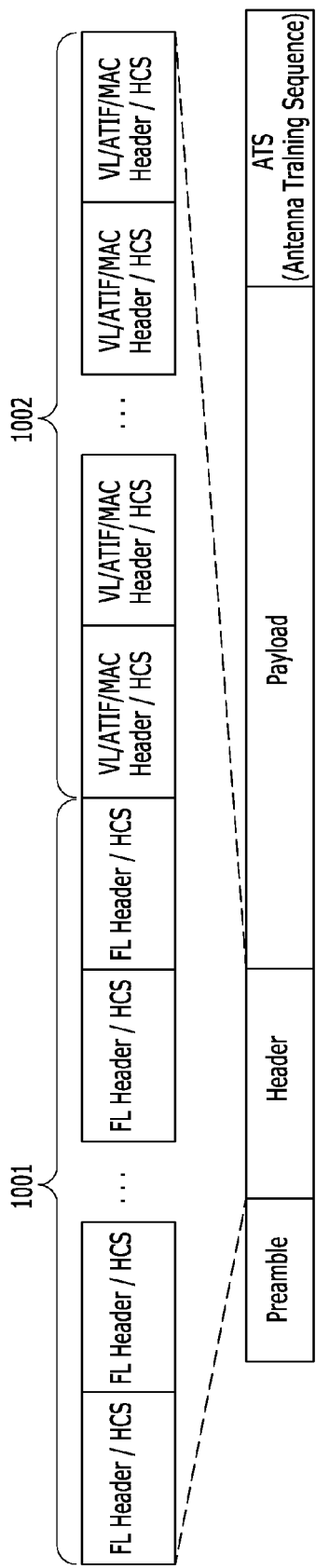
FIG. 10 is a diagram illustrating a frame format in accordance with a ninth embodiment of the present invention.

FIG. 10 is a diagram illustrating a frame format in accordance with a ninth embodiment of the present invention.

Like the data frame shown in FIG. 9, a FL PHY header and a HCS for the FL PHY header are repeatedly allocated in a first region 1001 in a data frame in accordance with a ninth embodiment of the present invention. Further, a VL PHY header, a MAC Header, an ATIF, and a HCS for the VL PHY header, the MAC Header, and the ATIF are repeatedly allocated in a second region 1002 of the data frame in accordance with the ninth embodiment of the present invention. Here, the HCS for the FL PHY header may be allocated in the second region 1002 instead of the first region 1001.

Figure 11:
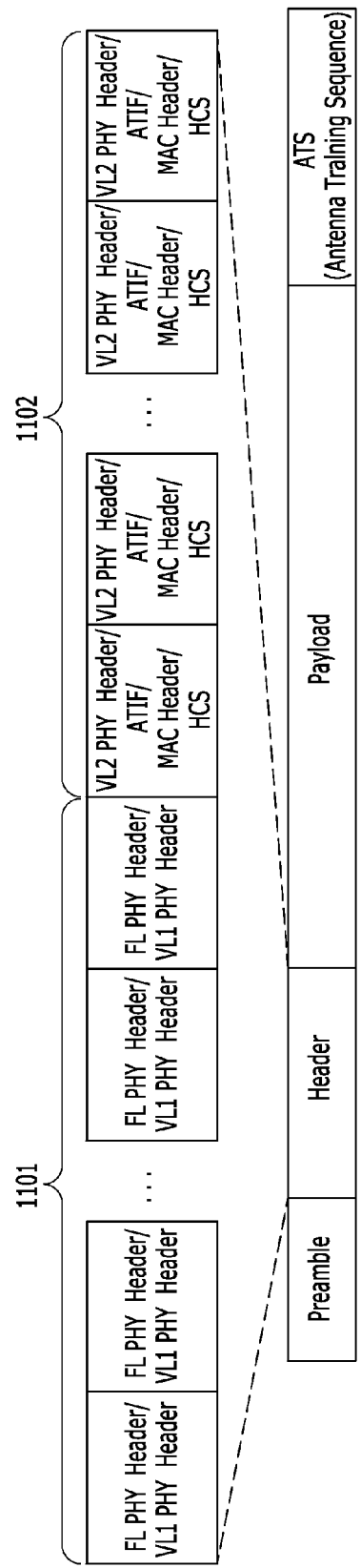
FIG. 11 is a diagram illustrating a data frame format in accordance with a tenth embodiment of the present invention.

FIG. 11 is a diagram illustrating a data frame format in accordance with a tenth embodiment of the present invention.

Like the data frame of FIG. 10, a FL PHY header and a VL1 PHY header are repeatedly allocated in a first region 1101 of the data frame in accordance with the tenth embodiment of the present invention. Further, a VL2 PHY header, an ATIF, a MAC header, a FL PHY header, and a HCS for the VL2 PHY header, the ATIF, the MAC header, and the FL PHY header are repeatedly allocated in a second region 1102 of the data frame in accordance with the tenth embodiment of the present invention. Here, a HCS for the FL PHY header and the VL1 PHY header may be further allocated in the first region 1101.

Meanwhile, the FL PHY header and the VL1 PHY header may be repeatedly allocated like the FL PHY header and the VL1 PHY header shown in FIG. 7. That is, a FL PHY header is repeatedly allocated as many as the predetermined number. Then, a VL1 PHY header is repeatedly allocated as many as the predetermined number.

The data frame formats in accordance with the first to tenth embodiments of the present invention permit a receiving device to decode a payload before decoding entire header information or to decode the first or some segments of a payload before decoding entire header information. Therefore, the data frame formats in accordance with the first to tenth embodiments of the present invention reduce latency caused by decoding entire headers and reduces excessive buffering the payload without increasing the complexity of the receiving device and the manufacturing cost thereof to increase or improve a decoding speed of the data frame.

In the embodiments of the present invention shown in FIGS. 2 to 11, the ATIF may be allocated or not allocated to the data frame according to a system type (A, B, or C) of EMCA. Under an assumption that there is no difference in a channel quality of a physical layer, the HCS and the RS parity for the MAC header may not be allocated in the data frames. It is because error correction and error detection are performed for headers allocated prior to a MAC header. In the embodiments shown in FIGS. 2 to 11, the number of headers repeatedly allocated in a predetermined region may vary according to a system design.

For comparability with a ECMA-384 frame format, one of bits (or two bits) for Reserved bit information or Number of MSDUs information among bit allocation information of a FL PHY header of the data frame according to the present invention may be used to indicate whether the data frame has a typical ECMA-387 frame format or the data frame format in accordance with the embodiments of the present invention. Therefore, based on the predetermined bits in the FL PHY header, a receiving device can determine whether a received data frame is a typical data frame or the data frame according to the present invention, and perform demodulation and decoding based on the determination result.

Hereinafter, a method and apparatus for generating a data frame, a method and apparatus for transmitting a data frame, and a method and apparatus for receiving a data frame in accordance with an embodiment of the present invention will be described. The method and apparatus for generating a data frame in accordance with an embodiment of the present invention generate a data frame shown in FIGS. 2 to 11. The method and apparatus for transmitting a data frame in accordance with an embodiment of the present invention generates the data frame shown in FIGS. 2 to 11 and transmits the data frame to a receiving device. The method and apparatus for receiving a data frame in accordance with an embodiment of the present invention receives a data frame shown in FIGS. 2 to 11 from a transmitting device and decodes the received data frame. Hereinafter, the method and apparatus for generating, transmitting, and receiving a data frame in accordance with an embodiment of the present invention will be described based on a data frame of FIG. 7.

Figure 12:
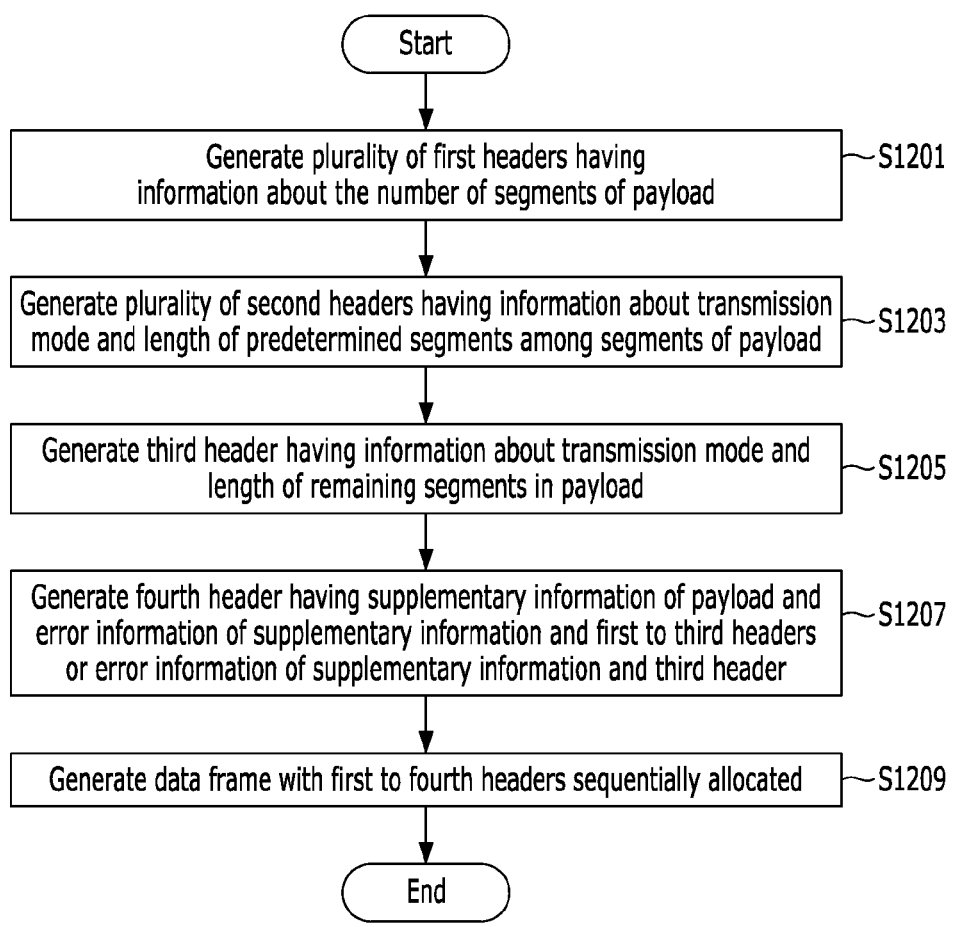
FIG. 12 is a diagram illustrating a method for generating a data frame in accordance with an embodiment of the present invention.

FIG. 12 is a diagram illustrating a method for generating a data frame in accordance with an embodiment of the present invention. FIG. 12 shows the method for generating a data frame in accordance with an embodiment of the present invention of a data frame generating apparatus.

At step S1201, a data frame generating apparatus in accordance with an embodiment of the present invention generates a plurality of first headers including information about the number of segments of a payload. At step S1203, the data frame generating apparatus in accordance with an embodiment of the present invention generates a plurality of second headers including information about a transmission mode and a length of predetermined segments among the segments of the payload. At step S1205, the data frame generating apparatus in accordance with an embodiment of the present invention generates a third header including information about a transmission mode and a length of the remaining segments thereof. At step S1207, the data frame generating apparatus generates a fourth header including supplementary information about the payload. The forth header further includes error information about the supplementary information and the first to third header or error information about the supplementary information and the third header. At step S1209, the data frame generating apparatus in accordance with an embodiment of the present invention generates a data frame with the first to fourth headers sequentially allocated.

The second header includes information about a transmission mode and a length of a first segment among segments of the payload. The data frame generating apparatus in accordance with an embodiment of the present invention may generate five first headers and five second headers. That is, the data frame includes five first headers and five second headers. The plurality of first and second headers are decodes based on a repetition coding scheme in a receiving device that receives the data frame. The third header and the fourth header are decoded based on a RS coding scheme in the receiving device.

That is, the fourth header includes an ATIF including beam forming information of the data frame, a MAC header including MAC information, error detection code information for the first to third headers, the ATIF, and the MAC header or the third header, the ATIF, and the MAC header, and error correction code information for the third header, the ATIF, and the MAC header. The first header is a FL PHY header, the second and third headers are a VL PHY header. The data frame may be a PPDU frame.

Figure 13:
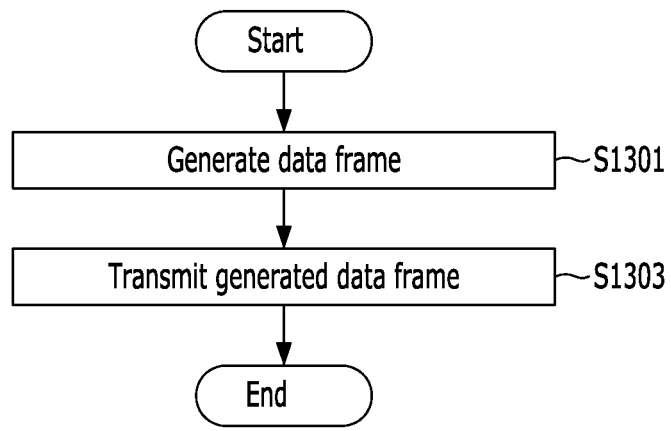
FIG. 13 is a diagram illustrating a method for transmitting a data frame in accordance with an embodiment of the present invention.

FIG. 13 is a diagram illustrating a method for transmitting a data frame in accordance with an embodiment of the present invention. FIG. 13 shows the method for transmitting a data frame of a data frame transmitting apparatus in accordance with an embodiment of the present invention.

At step S1301, the data frame transmitting apparatus in accordance with an embodiment of the present invention generates a data frame. At step S1303, the data frame transmitting apparatus in accordance with an embodiment of the present invention transmits the generated data frame to a receiving device. The generated data frame of the step S1301 may be the data frame described in FIG. 12.

Figure 14:
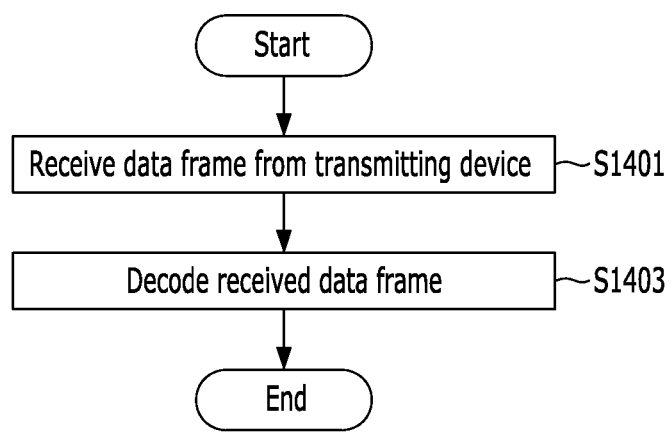
FIG. 14 is a diagram illustrating a method for receiving a data frame in accordance with an embodiment of the present invention.

FIG. 14 is a diagram illustrating a method for receiving a data frame in accordance with an embodiment of the present invention. FIG. 14 shows the method for receiving a data frame of a data frame receiving apparatus in accordance with an embodiment of the present invention.

At step S1401, the data frame receiving apparatus in accordance with an embodiment of the present invention receives a data frame from a transmitting device. At step S1403, the data frame receiving apparatus in accordance with an embodiment of the present invention decodes the received data frame. Here, the transmitting device may be the data frame transmitting apparatus of FIG. 13. The received data frame may be the data frame described in FIG. 12. The data frame receiving apparatus in accordance with an embodiment of the present invention decodes a plurality of first and second headers according to a repetition coding scheme and decodes a third header and a fourth header according to a RS coding scheme.

In FIGS. 12 to 14, the present invention was described from a process perspective. However, each step of the method for generating, transmitting, and receiving a data frame in accordance with an embodiment of the present invention may be understood from a hardware perspective. Therefore, the steps of the method for generating, transmitting, and receiving a data frame in accordance with an embodiment of the present invention may be understood as constituent elements of an apparatus for generating, transmitting, and receiving a data frame in accordance with an embodiment of the present invention.

A data frame generating apparatus in accordance with an embodiment of the present invention includes: a first header generator configured to generate a plurality of first headers including information about the number of segments of a payload; a second header generator configured to generate a plurality of second headers including information about a transmission mode and a length of predetermined segments among the segments of the payload; a third header generator configured to generate a third header including information about a transmission mode and a length of the remaining segments included in the payload; a fourth header generator configured to generate a fourth header including supplemental information of the payload, error information of the supplementary information and the first to third headers or error information of the supplementary information and the third header; and a frame generator configured to generate a data frame with the first to fourth headers sequentially allocated.

A data frame transmitting apparatus in accordance with an embodiment of the present invention includes: a frame generator configured to generate a data frame; and a frame transmitter configured to transmit the data frame to a receiving device. The data frame includes a plurality of first headers having information about the number of segments of a payload; a plurality of second headers having information about a transmission mode and a length of predetermined segments among segments of the payload; a third header having information about a transmission mode and a length of the remaining segments of the payload; and a fourth header having supplementary information of the payload, error information of the supplementary information and the first to third headers, or error information of the supplementary information and the third header. The first to fourth headers are sequentially allocated in the data frame.

A data frame receiving apparatus in accordance with an embodiment of the present invention includes a frame receiver configured to receive a data frame from a transmitting device; and a decoder configured to decode the received data frame. The data frame includes a plurality of first headers having information about the number of segments of a payload; a plurality of second headers having information about a transmission mode and a length of predetermined segments among segments of the payload; a third header having information about a transmission mode and a length of the remaining segments of the payload; and a fourth header having supplementary information of the payload, error information of the supplementary information and the first to third headers, or error information of the supplementary information and the third header. The first to fourth headers are sequentially allocated in the data frame. The decoder decodes the plurality of first to second headers according to a repetition coding scheme and decodes the third and fourth headers according to a RS coding scheme.

As described above, the method and apparatus for generating, transmitting, and receiving a data frame in accordance with an embodiment of the present invention provides a data frame that permits a receiving device to firstly decode a header having information about predetermined segments among segments of a payload. Therefore, latency caused by decoding entire header information can be reduced, and a buffering amount of a payload can be also reduced. Accordingly, the complexity of a receiving device and a manufacturing cost thereof can be reduced.

The above-described methods can also be embodied as computer programs. Codes and code segments constituting the programs may be easily construed by computer programmers skilled in the art to which the invention pertains. Furthermore, the created programs may be stored in computer-readable recording media or data storage media and may be read out and executed by the computers. Examples of the computer-readable recording media include any computer-readable recoding media, e.g., intangible media such as carrier waves, as well as tangible media such as CD or DVD.

While the present invention has been described with respect to the specific embodiments, it will be apparent to those skilled in the art that various changes and modifications may be made without departing from the spirit and scope of the invention as defined in the following claims.

What is claimed is:

1. A method for generating a data frame in a wireless communication system, the method comprising:
    generating a plurality of first headers having information about the number of segments of a payload;
    generating a plurality of second headers having information about a transmission mode and a length of predetermined segments among segments of the payload;
    generating a third header having a transmission mode and a length of remaining segments of the payload;
    generating a fourth header having supplementary information of the payload and error information of the supplementary information and the first to third headers or error information of the supplementary information and the third header;
    generating a data frame with the first to fourth headers sequentially allocated, and
    transmitting the generated data frame to a receiving device,
    wherein at least some of the predetermined segments of the payload are decoded before decoding information about headers allocated after the plurality of second headers.

2. The method of claim 1, wherein one of the second headers has information about a transmission mode and a length of a first segment among the segments included in the payload.

3. The method of claim 1, wherein in said generating a plurality of first headers and said generating a plurality of second headers, five first headers and five second headers are generated.

4. The method of claim 1, wherein the plurality of first and second headers are decoded according to a repetition coding scheme in a receiving device that receives the data frame, and
    wherein the third header and the fourth header are decoded according to a RS coding scheme in the receiving device.

5. The method of claim 1, wherein the fourth header includes:
    an Antenna Training Indicator Field (ATIF) having beam forming information of the data frame;
    a Medium Access Control (MAC) header having MAC information;
    a Header Check Sequence (HCS) for the first to third headers, the ATIF, the MAC header, or for the third header, the ATIF, and the MAC header; and
    a Reed-Solomon (RS) parity for the third header, the ATIF, and the MAC header.

6. The method of claim 1, wherein each of the first headers is a FL PHY header, and
    wherein the second and third headers are VL PHY headers.

7. The method of claim 1, wherein the data frame is a PLCP protocol data unit (PPDU) frame where PLCP stands for Physical Layer Convergence Procedure.

8. A method for transmitting a data frame in a wireless communication system, the method comprising:
    generating a data frame; and
    transmitting the generated data frame to a receiving device,
    wherein the data frame includes:
    a plurality of first headers having information about the number of segments of a payload;
    a plurality of second headers having information about a transmission mode and a length of predetermined segments among the segments of the payload;
    a third header having information about a transmission mode and a length of remaining segments of the payload;
    a fourth header having information about supplementary information of the payload and error information of the supplementary information and the first to third headers or error information of the supplementary information and the third header,
    wherein the first to fourth headers are sequentially allocated in the data frame, and
    wherein at least some of the predetermined segments of the payload are decoded before decoding information about headers allocated after the plurality of second headers.

9. The method of claim 8, wherein one of the second headers has information about a transmission mode and a length of a first segment among the segments of the payload.

10. The method of claim 8, wherein the data frame includes five first headers and five second headers.

11. The method of claim 8, wherein the fourth header includes:
    an Antenna Training Indicator Field (ATIF) having beam forming information of the data frame;
    a Medium Access Control (MAC) header having MAC information;
    a Header Check Sequence (HCS) for the first to third headers, the ATIF, the MAC header, or for the third header, the ATIF, and the MAC header; and
    a Reed-Solomon (RS) parity for the third header, the ATIF, and the MAC header,
    wherein the plurality of first and second headers are decoded according to a repetition coding scheme in the receiving device, and
    wherein the third and fourth headers are decoded according to a Reed-Solomon (RS) coding scheme in the receiving device.

12. A method for receiving a data frame in a wireless communication system, the method comprising:
    receiving a data frame from a transmitting device; and
    decoding the received data frame,
    wherein the data frame includes:
    a plurality of first headers having information about the number of segments of a payload;
    a plurality of second headers having information about a transmission mode and a length of predetermined segments among the segments of the payload;

a third header having information about a transmission mode and a length of remaining segments of the payload;

a fourth header having information about supplementary information of the payload and error information of the supplementary information and the first to third headers or error information of the supplementary information and the third header, wherein the first to fourth headers are sequentially allocated in the data frame, and wherein at least some of the predetermined segments of the payload are decoded before decoding information about headers allocated after the plurality of second headers.

13. The method of claim 12, wherein one of the second headers has information about a transmission mode and a length of a first segment of the segments included in the payload.

14. The method of claim 12, wherein the data frame includes five first headers and five second headers.

15. The method of claim 12, wherein the fourth header includes:
- an Antenna Training Indicator Field (ATIF) having beam forming information of the data frame;
- a Medium Access Control (MAC) header having MAC information;
- a Header Check Sequence (HCS) for the first to third headers, the ATIF, the MAC header, or for the third header, the ATIF, and the MAC header; and
- a Reed-Solomon (RS) parity for the third header, the ATIF, and the MAC header,
- wherein in said decoding the received data frame, the plurality of first and second headers are decoded according to a repetition coding scheme, and the third and fourth headers are decoded according to a Reed-Solomon coding scheme.

16. An apparatus for transmitting a data frame in a wireless communication system, the apparatus comprising:
- a frame generator configured to generate a data frame; and
- a frame transmitter configured to transmit the generated data frame to a receiving device,
- wherein the data frame includes:
- a plurality of first headers having information about the number of segments of a payload;
- a plurality of second headers having information about a transmission mode and a length of predetermined segments among the segments of the payload;
- a third header having information about a transmission mode and a length of remaining segments of the payload;
- a fourth header having information about supplementary information of the payload and error information of the supplementary information and the first to third headers or error information of the supplementary information and the third header,
- wherein the first to fourth headers are sequentially allocated in the data frame, and
- wherein at least some of the predetermined segments of the payload are decoded before decoding information about headers allocated after the plurality of second headers.

17. An apparatus for receiving a data frame in a wireless communication system, the apparatus comprising:
- a frame receiver configured to receive a data frame from a transmitting device; and
- a decoder configured to decode the data frame,
- wherein the data frame includes:
- a plurality of first headers having information about the number of segments of a payload;
- a plurality of second headers having information about a transmission mode and a length of predetermined segments among the segments of the payload;
- a third header having information about a transmission mode and a length of remaining segments of the payload;
- a fourth header having information about supplementary information of the payload and error information of the supplementary information and the first to third headers or error information of the supplementary information and the third header,
- wherein the first to fourth headers are sequentially allocated in the data frame, and
- wherein at least some of the predetermined segments of the payload are decoded before decoding information about headers allocated after the plurality of second headers.

18. The apparatus of claim 17, wherein the decoder decides the plurality of first headers and the plurality of second headers based on a repetition coding scheme and decodes the third and fourth headers based on a Reed-Solomon (RS) coding scheme.

* * * * *